(12) United States Patent
Sakata et al.

(10) Patent No.: US 9,382,892 B2
(45) Date of Patent: Jul. 5, 2016

(54) VEHICLE PERFORMING IDLING STOP

(71) Applicant: SANYO Electric Co., Ltd., Osaka (JP)

(72) Inventors: Hideki Sakata, Hyogo (JP); Nobuyuki Ohsumi, Hyogo (JP); Kaoru Nakajima, Hyogo (JP); Akinobu Tsunesada, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/435,431

(22) PCT Filed: Oct. 24, 2013

(86) PCT No.: PCT/JP2013/006299
§ 371 (c)(1),
(2) Date: Apr. 13, 2015

(87) PCT Pub. No.: WO2014/068920
PCT Pub. Date: May 8, 2014

(65) Prior Publication Data
US 2015/0275841 A1    Oct. 1, 2015

(30) Foreign Application Priority Data

Oct. 29, 2012    (JP) .................................. 2012-238124

(51) Int. Cl.
*F02N 11/00*    (2006.01)
*F02N 11/08*    (2006.01)
(Continued)

(52) U.S. Cl.
CPC .......... *F02N 11/0862* (2013.01); *B60R 16/033* (2013.01); *F02N 11/087* (2013.01);
(Continued)

(58) Field of Classification Search
CPC ..... F02N 11/0814; F02N 11/14; F02N 11/08; F02N 11/0818; F02N 11/0829; F02N 11/04
USPC ................. 123/179.28, 179.29, 179.3, 179.4; 701/112, 113; 307/9.1, 10.1, 10.6, 307/10.7; 320/103, 104
See application file for complete search history.

(56) References Cited

U.S. PATENT DOCUMENTS 6,528,899 B1 *    3/2003    Saito .......................... H02J 1/14
307/10.1
2003/0160510 A1    8/2003    Mizutani et al.

FOREIGN PATENT DOCUMENTS

| JP | 2003-137044 | 5/2003 |
| JP | 2003-254208 | 9/2003 |
| JP | 2011-208599 | 10/2011 |

OTHER PUBLICATIONS

International Search Report of PCT application No. PCT/JP2013/006299 dated Dec. 17, 2013.

*Primary Examiner* — Mahmoud Gimie
(74) *Attorney, Agent, or Firm* — Wenderoth, Lind & Ponack, L.L.P.

(57) ABSTRACT

A vehicle comprises an engine, a starter motor, and a starter battery supplying power to the starter motor, further an auxiliary power storage system connected in parallel to the starter battery, an alternator for generating regenerative power and charging the starter battery and the auxiliary power storage system, an engine room for disposing the engine, and a cabin for disposing the auxiliary power storage system. The auxiliary power storage system comprises a power storage portion for electric equipment connected in parallel to the starter battery through a relay, and a relay controlling circuit configured to carry out the ON control of the relay at power generation of the alternator, and the OFF control of the relay at restarting the engine in a state of idling stop, and further the relay is disposed in the engine room.

7 Claims, 1 Drawing Sheet

(51) Int. Cl.
  *F02N 11/14* (2006.01)
  *B60R 16/033* (2006.01)
  *H02J 7/14* (2006.01)
  *F02N 11/04* (2006.01)
  *H01M 10/34* (2006.01)
  *H01M 10/44* (2006.01)
  *H01M 10/52* (2006.01)

(52) U.S. Cl.
  CPC ........ *F02N11/0814* (2013.01); *F02N 11/0818* (2013.01); *F02N 11/0829* (2013.01); *F02N 11/0866* (2013.01); *F02N 11/14* (2013.01); *H02J 7/1423* (2013.01); *F02N 2200/062* (2013.01); *F02N 2200/063* (2013.01); *F02N 2200/064* (2013.01); *H01M 10/345* (2013.01); *H01M 10/441* (2013.01); *H01M 10/52* (2013.01); *H01M 2220/20* (2013.01)

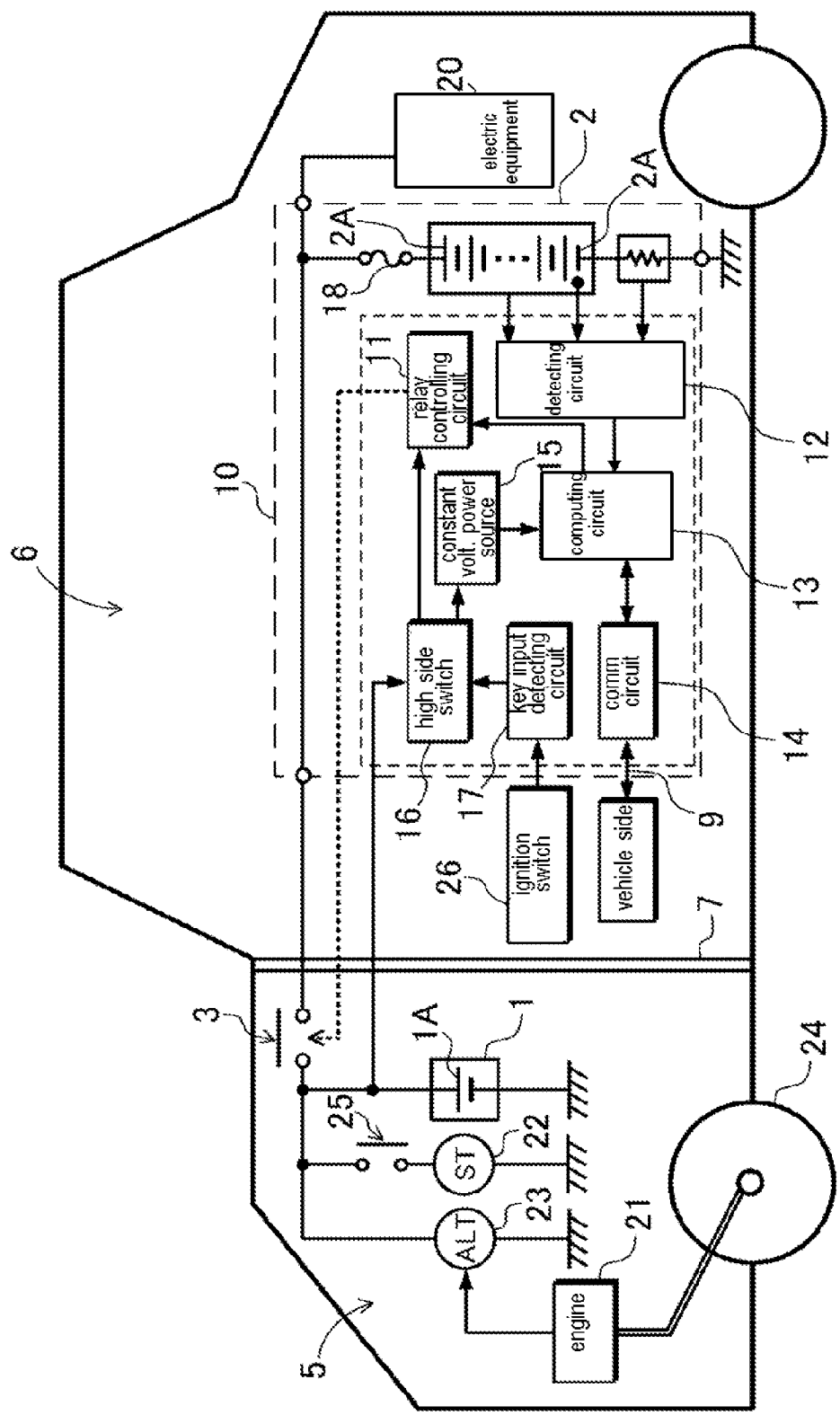

VEHICLE PERFORMING IDLING STOP

TECHNICAL FIELD

The present invention is related to a vehicle performing idling stop during waiting for a traffic light.

BACKGROUND ART

A vehicle performing idling stop (idling reduction) can considerably improve a fuel efficiency by stopping an idling of an engine. In the vehicle performing regenerative power generation, a battery is charged through driving an alternator by kinetic energy of the vehicle at deceleration. In the vehicle performing idling stop, it is necessary to supply power from the battery to the starter motor at restarting the engine, and the battery supplying power to the starter motor is configured to be charged by the alternator. As the battery supplying power to the starter motor, considering the battery characteristics, a lead-acid battery having a nominal voltage 12 V is generally used. However, as the lead-acid battery has a relatively large charging resistance, it is not efficiently charged with regenerative generation power.

In addition, in the vehicle performing idling stop for improving a fuel efficiency, in a state where an ignition switch as a main switch of the vehicle is held in the ON state, the engine is stopped when the vehicle is stopped due to waiting for the traffic light, and the engine is restarted and the vehicle moves at the time of signal changing. In the vehicle, each time the engine is restarted, power is supplied from the lead-acid battery to the starter motor. As a consuming current of the starter motor is remarkably large, the voltage of the lead-acid battery temporarily remarkably drops at restarting the engine, for example, at less than 9 V, namely a state of the instantaneous voltage drop occurs. When the instantaneous voltage drop in the lead-acid battery occurs, a control unit for a vehicle or other electric equipment which operate by using the power source of the lead-acid battery cannot operate in the normal state temporarily, and there is a demerit that the normal operation cannot be ensured.

In order to resolve this demerit, the power supply device where the lead-acid battery is connected in parallel to a sub-battery is developed. (refer to patent literatures 1 and 2)

CITATION LIST

Patent Literature

Patent Literature 1: Japanese Laid-Open Patent Publication No. 2011-208599
Patent Literature 2: Japanese Laid-Open Patent Publication No. 2003-254208

SUMMARY OF THE INVENTION

In the power supply device described in these patent literatures, a lithium ion secondary battery is connected in parallel to the lead-acid battery. The lead-acid battery and the lithium ion secondary battery are charged by the alternator. Further, in the power supply device, a relay is connected between the lead-acid battery and the lithium ion secondary battery. When power is supplied to the starter motor, the relay is turned on, and power is supplied from the lead-acid battery or the lithium ion secondary battery to the starter motor. The power supply device is disposed in the cabin, and degradation of the lithium ion secondary battery by heat is prevented, and then a life can be prolonged. However, when the power supply device is disposed in the cabin, it is difficult to cut the noise of changing ON/OFF of the relay switch. Each time the starter motor restarts the engine, the noise occurs. This demerit is resolved by disposing the power supply device in the engine room. The degradation of the sub-battery by heat is remarkable, and its life is shortened.

The present disclosure is developed for the purpose of solving such demerits. One non-limiting and explanatory embodiment provides a vehicle performing idling stop where degradation of the sub-battery by heat is prevented, and the noise of switching a relay is made small.

A vehicle performing idling stop of the present disclosure comprises an engine for driving a vehicle, a starter motor for starting the engine, and a starter battery supplying power to the starter motor, and the engine is stopped at idling, and the engine is restarted by the starter motor. Further the vehicle performing idling stop comprises an auxiliary power storage system connected in parallel to the starter battery, an alternator for generating regenerative power at deceleration of the vehicle, and charging the starter battery and the auxiliary power storage system, an engine room for disposing the engine, and a cabin for disposing the auxiliary power storage system. The auxiliary power storage system comprises a power storage portion for electric equipment connected in parallel to the starter battery through a relay, and a relay controlling circuit configured to carry out the ON control of the relay at power generation of the alternator, and the OFF control of the relay at restarting the engine in a state of idling stop, and further the relay is disposed in the engine room.

In the above vehicle, degradation of the auxiliary power storage system by heat is prevented, and the noise of switching the relay is made small. It is a reason why the auxiliary power storage system connected in parallel to the starter battery is disposed in the cabin and the relay is disposed in the engine room. The environmental temperature of the auxiliary power storage system is increased in summer, it degrades the battery. The temperature of the engine room of the vehicle becomes the abnormal high temperature by exhausted heat of the engine or an exhaust pipe, exhausted heat of a radiator, and exhausted heat of a condenser for cooling. The cabin is cooled, or ventilated, and the temperature at which the driver feels comfortable is held. Therefore, the auxiliary power storage system disposed in the cabin is not heated at the abnormal high temperature, and the degradation by the increased temperature can be reduced. The relay is connected to the auxiliary power storage system, and the relay is disposed at the vicinity of the auxiliary power storage system, and then lead wire can be shortened. However, in the present disclosure, the relay connected to the auxiliary power storage system is disposed not in the cabin, but in the engine room. Thus, the sound-insulated structure of the relay is simple, and the noise at switching the relay can be reduced.

In the vehicle performing idling stop of the present disclosure, the starter battery is a lead-acid battery.

In this vehicle, a large current is supplied from the lead-acid battery to the starter motor, and the engine is surely restarted by the starter motor. It is a reason why the lead-acid battery has a very small discharging resistance and the excellent discharging characteristics. As a large current is not supplied from the power storage portion for electric equipment to the starter motor, the degradation of the power storage portion for electric equipment by a large discharging current can be prevented.

In the vehicle performing idling stop of the present disclosure, the starter battery is a lead-acid battery, and the power storage portion for electric equipment is a nickel hydride battery.

The cell of the nickel hydride battery has a nominal voltage 1.2 V, 10 series connection of the nickel hydride batteries has a nominal voltage 12 V of the power storage device for electric equipment. Therefore, 10 series connection of the nickel hydride batteries is used as the power storage device for electric equipment, the nominal voltage of the power storage device for electric equipment and the lead-acid battery is made the approximately same. Therefore, in the vehicle, the power storage device for electric equipment and the lead-acid battery is connected in parallel without through the DC/DC converter, and both of the power storage device for electric equipment and the lead-acid battery are charged in well balance with regenerative generation power of the alternator. Further, in the state of restarting the engine, the operating power is supplied from the power storage device for electric equipment not connected to the lead-acid battery to the electric equipment, and at the timing except for restarting the engine the operating power is stably supplied in well balance from both of the starter battery and the power storage portion for the electric equipment to the electric equipment.

In the vehicle performing idling stop of the present disclosure, the power storage portion for electric equipment is a lithium ion secondary battery.
In this vehicle, the power storage portion for electric equipment is made compact or light, and its charging and discharging capacity is made large.

In the vehicle performing idling stop of the present disclosure, the power storage portion for electric equipment is the nickel hydride battery, and supplies power to the electric equipment of the vehicle in the state of idling stop without through a DC/DC converter.
In this vehicle, without through the DC/DC converter, even at restarting the engine, the operating power is stably supplied from the power storage portion for electric equipment to the electric equipment. It is a reason why the nickel hydride battery has the excellent constant voltage characteristics.

In the vehicle performing idling stop of the present disclosure, the electric equipment to which power is supplied from the power storage portion for the electric equipment is a power steering, or a controlling unit of the vehicle performing idling stop.
In this vehicle, even at restarting the engine, the power steering normally operates, or an erroneous operation such as a reset by the instantaneous voltage drop in the controlling unit of the vehicle performing idling stop can be prevented.

In the vehicle performing idling stop of the present disclosure, a nominal capacity of the starter battery is larger than a nominal capacity of the power storage portion for electric equipment, and operating power is supplied from the starter battery to the auxiliary power storage system.
In this vehicle, the operating power is stably supplied from the starter battery having the large capacity to a circuit of the auxiliary power storage system.

BRIEF DESCRIPTION OF DRAWINGS

FIG. 1 is a schematic configuration view (block diagram) of a vehicle performing idling stop related to one embodiment of the present invention.

DESCRIPTION OF EMBODIMENTS

Hereinafter, the embodiment of the present invention will be described referring to drawings. However, the following embodiments illustrate a vehicle performing idling stop which is aimed at embodying the technological concept of the present invention, and the present invention is not limited to the vehicle performing idling stop described below. Further, the members illustrated in Claims are not limited to the members in the embodiments.

The vehicle of FIG. 1 includes a starter battery 1 which supplies power to a starter motor 22 for starting an engine 21, an auxiliary power storage system 10 having a power storage portion 2 for electric equipment connected in parallel to the starter battery 1 through a relay 3, a relay controlling circuit 11 configured to carry out the ON/OFF control of the relay 3, and an alternator 23 which charges both of the starter battery 1 and the power storage portion 2 for electric equipment with regenerative generation power.

The vehicle having the idle stop function rotates the alternator 23 by kinetic energy at deceleration. In the regenerative braking state, a wheel 24 rotates the engine 21, and the engine 21 rotates the alternator 23. A rotating torque of the alternator 23 brakes and decelerates the vehicle through the engine 21. Power generated from the alternator 23 by regenerative braking becomes large in direct proportion to kinetic energy of the vehicle. The kinetic energy of the vehicle becomes large in direct proportion to the product of the weight of the vehicle multiplied by the square of the speed. For example, a vehicle of the speed 60 km/h and 1 ton has the kinetic energy of approximate 40 Wh. Assuming that the battery is charged with an efficiency 50% of the kinetic energy, a standard size car of the speed 60 km/h can charge the battery with power of 20 Wh each time the vehicle is stopped due to waiting for a traffic light.

As in the regenerative braking the battery is charged with a remarkably large current during a short time till a stop of the vehicle, it is important that the battery is efficiently charged. In the vehicle of FIG. 1, the power storage portion 2 for the electric equipment is connected in parallel to the starter battery 1 in order to efficiently charge by the regenerative generation power. The starter battery 1 is a lead-acid battery 1A. The lead-acid battery 1A has a remarkably low discharging resistance and the excellent discharging characteristics, and it supplies a large current to the starter motor 22 to smoothly restart the engine 21. Here, the starter battery is not limited to the lead-acid battery, and all of batteries capable to supply power to the starter motor for restarting the engine, can be used as the starter battery.

The power storage portion 2 for the electric equipment has the more excellent charging characteristics than that of the lead-acid battery 1A, and is a nickel hydride battery 2A. Here, as the power storage portion for the electric equipment, the non-aqueous electrolyte secondary battery such as a lithium ion secondary battery or a lithium polymer battery can be used. The nickel hydride battery 2A has remarkably small charging resistance and the excellent charging characteristics by large current. The non-aqueous electrolyte secondary battery such as a lithium ion secondary battery, has a light weight and a large charging and discharging capacity. Further, In this embodiment, as the power storage portion for the electric equipment, examples of using secondary batteries is explained. As the power storage portion for the electric equipment, in place of the secondary batteries or in addition to these, a capacity such as an electrical double layer capacitor (EDLC) can be used.

The starter battery 1 is the lead-acid battery 1A of the nominal voltage 12 V. Here, as the starter battery, the lead-acid battery having the nominal voltage of 24 V, 36 V, or 48 V can be used. As the power storage portion 2 for the electric equipment is connected to the starter battery 1 without through a DC/DC converter, the number of the series-connected batteries is adjusted, and then the nominal voltage is made the same or the approximately same as the nominal voltage of the lead-acid battery. As the nominal voltage 12 V of the lead-acid battery 1A as the starter battery 1 is connected in parallel to the nickel hydride battery 2A of the power storage portion 2 for the electric equipment, 10 series connection of the nickel hydride batteries 2A has a nominal voltage 12 V of the power storage device 2.

By the regenerative braking, the alternator 23 charge both of the starter battery 1 and the power storage portion 2 for the electric equipment. Therefore, the relay controlling circuit 11 carries out the ON state control of the relay 3 in the state of the regenerative power generation of the alternator 23, and then both of the starter battery 1 and the power storage portion 2 for the electric equipment are charged with the regenerative generation power.

The engine 21 is stopped in a stop state of the vehicle due to waiting for the traffic light, and then the fuel efficiency is improved. Namely, the fuel efficiency is improved by the idle stop (idle reduction). It is necessary that this vehicle restarts the engine 21 when the vehicle moves from the idle stop state. Each time the engine 21 is restarted, the starter switch 25 of the starter motor 22 is turned on. The starter motor 22 has a remarkably small resistance in order to make the rotating torque large. Therefore, in the state of the ON state of the starter switch 25, the voltage of the starter battery 1 drops from 12 V to about 9 V. Especially, when the internal resistance of the starter battery 1 becomes large by degradation, it happens that the voltage of the starter battery 1 drops to 9 V or less in the state of the ON state of the starter switch 25. Namely, in the vehicle having the idle stop function, every time the engine 21 is restarted, the voltage of the starter battery 1 temporarily drops. Due to the instantaneous voltage drop when the voltage of the battery temporarily drops, a stable operation of the electric equipment 20 receiving the operating power is not guaranteed, and it might cause an erroneous operation. Especially, restarting of the engine 21 is different from starting the engine 21 at the initial time by switching the ignition switch 26 in the ON state, and all of the electric equipment 20 is in the operating state. When the ignition switch 26 is turned on at the initial time, as the electric equipment 20 becomes the operating state after restarting the engine 21, the stable operation can be guaranteed. However, while the electric equipment 20 is in the operating state, since restarting of the engine 21 causes the instantaneous voltage drop, the normal operation of the electric equipment 20 cannot be guaranteed.

In the vehicle of FIG. 1, in order that the instantaneous voltage drop of the supplying voltage to the electric equipment 20 does not occur at the state of restarting the engine 21, the operating power is not supplied from the starter battery 1 to the electric equipment 20, namely the power storage portion 2 for the electric equipment is disconnected from the starter battery 1, and the operating power is supplied from the power storage portion 2 for the electric equipment to the electric equipment 20. Therefore, the relay controlling circuit 11 switches the relay 3 to the OFF state in the state where power is supplied to the starter motor 22, namely in the state where the starter switch 25 is the ON state. The electric equipment 20 to which the operative power is supplied from the power storage portion 2 for the electric equipment, is the electric equipment in which the normal operation is needed to be guaranteed even in the instantaneous voltage drop, for example, such as a power steering, or a micro-computer of controlling unit of the vehicle having the idle stop function. Various types of the electric equipment 20 devices are installed in the vehicle, all of the electric equipment devices are not necessarily supplied with the operative power from the power storage portion 2 for the electric equipment in the state of restarting the engine. The electric equipment devices in which harmful effects by the instantaneous voltage drop do not matter, for example, such as a heater for defrosting, a fan motor for an air conditioning, a car navigation system, or an audio can be also supplied with the operative power from the starter motor. Here, all of the electric equipment can be also supplied with the operative power from the power storage portion for the electric equipment. In the state of restarting the engine, which electrical device is supplied the operative power from the power storage portion for the electric equipment, is set considering a nominal capacity of the power storage portion for the electric equipment.

In the vehicle of FIG. 1, the relay controlling circuit 11 is provided in the auxiliary power storage system 10, and the auxiliary power storage system 10 and the vehicle side are connected by the communication line 9 such as CAN. The relay controlling circuit 11 detects an ON signal of the starter switch 25 transmitted from the vehicle side, and switches the relay 3 to the OFF state. Namely, the starter switch 25 is held in the ON state, and the relay 3 is held in the OFF state. When the starter switch 25 is switched to the OFF state, the relay 3 is switched to the ON state, and then the power storage portion 2 for the electric equipment is connected in parallel to the starter battery 1.

The auxiliary power storage system 10 of FIG. 1 includes the power storage portion 2 for the electric equipment, a fuse 18 connected in series to the power storage portion 2 for the electric equipment, a detecting circuit 12 which detects the battery state of the voltage, the current, or the temperature of the power storage portion 2 for the electric equipment, a computing circuit 13 incorporating a CPU computing the battery state detected by the detecting circuit 12, a communication circuit 14 connected to the computing circuit 13, a constant voltage power source 15, a high side switch 16 supplying power from the starter battery 1 to the constant voltage power source 15, a Key input detecting circuit 17 in which a signal of the ignition switch 26 from the vehicle side is inputted, and the relay controlling circuit 11 which switches the relay 3 to the OFF sate at the time of restarting.

In the auxiliary power storage system 10, when the ignition switch 26 is switched to the ON state, the Key input detecting circuit 17 detects this signal. The Key input detecting circuit 17 detects the ON signal of the ignition switch 26, and switches the high side switch 16 to the ON state, and the high side switch 16 of the ON sate supplies the operating power to the constant voltage power source 15 and the relay controlling circuit 11. The operating power is supplied from the starter battery 1 having the large nominal capacity. The starter battery 1 temporarily drops the voltage due to the instantaneous voltage drop, but the constant voltage power source 15 supplies a stable voltage to the computing circuit 13. In the auxiliary power storage system 10, when the ignition switch 16 is switched to the ON state, the computing circuit 13 and the relay controlling circuit 11 are switched to the operating state. In the OFF state of the ignition switch 26, the computing circuit 13 and the relay controlling circuit 11 become a resting state, and then power consumption is reduced. In the ON state of the ignition switch 26, namely the state where a driver drives the vehicle, when the engine 21 is restarted after the idle stop, from the vehicle side to the auxiliary power storage system 10, the ON signal of the starter switch 25 is transmitted to the computing circuit 13 through the communication circuit 14. Namely, in the state where the starter motor 22 restarts the engine 21, the relay 3 is the OFF state, and only the starter battery 1 supplies power to the starter motor 22, and the power storage portion 2 for the electric equipment is disconnected from the starter motor 22, and supplies the operating power to the electric equipment 20. When the engine 21 is restarted and the starter switch 25 is switched to the OFF state, the relay controlling circuit 11 switches the relay 3 to the ON state, and then the power storage portion 2 for the electric equipment is connected in parallel to the starter battery 1. In the auxiliary power storage system 10, at the timing except for restarting the engine 21, the starter battery 1 and the power storage portion 2 for the electric equipment are connected in parallel.

The alternator 23 charges so as to prevent over-discharging and over-charging of the starter battery 1 and the power storage portion 2 for the electric equipment. When the voltage of parallel-connected one of the starter battery 1 and the power storage portion 2 for the electric equipment decreases less than the minimum voltage, the alternator 23 generates power, and charges the starter battery 1 and the power storage portion 2 for the electric equipment. In the vehicle having the regenerative braking function, both of the starting battery 1 and the power storage portion 2 for the electric equipment are charged in the regenerative braking state. When the voltage of parallel-connected one of the starter battery 1 and the power storage portion 2 for the electric equipment does not decrease less than the minimum voltage with frequent charging by regenerative generation power, the engine 21 does not drive the alternator 23 for charging. But, When the voltage of parallel-connected one of the starter battery 1 and the power storage portion 2 for the electric equipment decreases less than the minimum voltage even with charging by regenerative generation power, the engine 21 drives the alternator 23 for charging. In the state where the starter battery 1 and the power storage portion 2 for the electric equipment are over-charged by too large amount of regenerative generation power, the output of the alternator 23 is restricted to be small, and then over-charging is prevented.

The relay 3 of the ON state connects the power storage portion 2 for the electric equipment and the starter battery 1 in parallel, and both of the starter battery 1 and the power storage portion 2 for the electric equipment are charged with regenerative generation power. The relay 3 of the OFF state disconnects the power storage portion 2 for the electric equipment from the starter battery 1, and only the power storage portion 2 for the electric equipment supplies the operating power to the electric equipment 20. The regenerative power generation rapidly charges the starter battery 1 and the power storage portion 2 for the electric equipment with a large current in a short time. Especially, a charging resistance of the power storage portion 2 for the electric equipment is made smaller than that of the starter battery, and the power storage portion 2 for the electric equipment is charged with a larger current than that of the starter battery 1, and then a comparatively large current flows through the relay 3 at the regenerative power generation. For example, as the alternator having an output current 200 A charges the power storage portion 2 for the electric equipment with 200 A at the regenerative power generation, the relay 3 has a large current capacity, namely the relay 3 having a large contact current capacity is required. The relay 3 having a large current capacity has large moving part, and at the switching time of ON/OFF it makes a big noise and a big vibration. It is a reason why the large moving part contact hits a fixed contact, or hits a stopper, detaching from the fixed contact Further, in the auxiliary power storage system 10, as the power storage portion 2 for the electric equipment, the nickel hydride battery 2A and the lithium ion secondary battery having a large charging and discharging capacity with respect to capacity and weight are used. These batteries have the characteristics in which the degradation at the high temperature is very large. Therefore, when the auxiliary power storage system 10 is disposed in the engine room 5, the degradation at the high temperature becomes very large. In addition, the power storage portion 2 for the electric equipment is charged with a larger current by the regenerative power generation than that of the starter battery 1, and heat generation amount in this state is large, and then the temperature increase of itself is also large. In order to prevent the degradation by the temperature increase, the auxiliary power storage system 10 is disposed in the cabin 6 such as the passenger cabin, or the trunk room. The temperature in the cabin 6 is low, compared with the engine room, and even in the hot summer the inside of the cabin 6 is cooled, and the temperature is low. Therefore, the degradation of the power storage portion 2 for the electric equipment by the temperature increase can be ideally prevented.

In the vehicle of the present embodiment, the auxiliary power storage system 10 is disposed in the cabin 6, and the degradation of the auxiliary power storage system 10 is prevented. However, the relay 3 which connects the auxiliary power storage system 10 to the starter battery 1, is disposed in the engine room 5. It is a reason why the noise level at which ON/OFF is switched can be reduced. The cabin 6 of the vehicle is separated from the engine room 5 by a metal board 6, and in this structure the noise of the engine room 5 is sound-insulated. Therefore, the relay 3 is disposed in the engine room 5, the noise at switching the relay 3 can be sound-insulated. The relay 3 connects the power storage portion 2 for the electric equipment to the starter battery 1, and the relay 3 is fixed to the chassis of the vehicle at the vicinity of the starter battery 1.

INDUSTRIAL APPLICABILITY

The vehicle of the present invention is a vehicle performing idling stop. The vehicle where the auxiliary power storage system is connected to the starter battery in parallel through the relay can suitably use the present invention.

The invention claimed is:

1. A vehicle performing idling stop comprising:
an engine for driving a vehicle;
a starter motor for starting the engine; and
a starter battery supplying power to the starter motor,
wherein the engine is stopped at idling, and the engine is restarted by the starter motor, further comprising:
an auxiliary power storage system connected in parallel to the starter battery;
an alternator for generating regenerative power at deceleration of the vehicle, and charging the starter battery and the auxiliary power storage system;
an engine room for disposing the engine; and
a cabin for disposing the auxiliary power storage system,
further the auxiliary power storage system comprising:
a power storage portion for electric equipment connected in parallel to the starter battery through a relay; and
a relay controlling circuit configured to carry out the ON control of the relay at power generation of the alternator, and the OFF control of the relay at restarting the engine in a state of idling stop,
wherein the relay is disposed in the engine room.

2. The vehicle performing idling stop according to claim 1, wherein the starter battery is a lead-acid battery.

3. The vehicle performing idling stop according to claim 1, wherein the starter battery is a lead-acid battery, and the power storage portion for electric equipment is a nickel hydride battery.

4. The vehicle performing idling stop according to claim 1, wherein the power storage portion for electric equipment is a lithium ion secondary battery.

5. The vehicle performing idling stop according to claim 3, wherein the power storage portion for electric equipment is the nickel hydride battery, and supplies power to the electric equipment of the vehicle in the state of idling stop without through a DC/DC converter.

6. The vehicle performing idling stop according to claim 1, wherein the electric equipment to which power is supplied from the power storage portion for the electric equipment is a power steering, or a controlling unit of the vehicle performing idling stop.

7. The vehicle performing idling stop according to claim 1, wherein a nominal capacity of the starter battery is larger than a nominal capacity of the power storage portion for electric equipment, and operating power is supplied from the starter battery to the auxiliary power storage system.

* * * * *